(12) United States Patent
Vujic

(10) Patent No.: US 6,983,768 B1
(45) Date of Patent: Jan. 10, 2006

(54) INSULATION MODULE, SYSTEM AND METHOD FOR INSTALLATION AND MANUFACTURE

(75) Inventor: Milivoj Vujic, Willagee (AU)

(73) Assignee: Bains Harding Limited, Osborne Park (AU)

( * ) Notice: Subject to any disclaimer, the term of this patent is extended or adjusted under 35 U.S.C. 154(b) by 0 days.

(21) Appl. No.: 09/830,398

(22) PCT Filed: Oct. 25, 1999

(86) PCT No.: PCT/AU99/00922

§ 371 (c)(1),
(2), (4) Date: Jul. 19, 2001

(87) PCT Pub. No.: WO00/25058

PCT Pub. Date: May 4, 2000

(30) Foreign Application Priority Data

Oct. 26, 1998 (AU) .................... PP6738

(51) Int. Cl.
*F16L 11/00* (2006.01)
*F16L 9/14* (2006.01)
*B32B 3/26* (2006.01)
*B32B 3/00* (2006.01)
*B29D 22/00* (2006.01)

(52) U.S. Cl. ............ 138/119; 138/120; 138/149; 428/36.9; 428/60; 428/61; 428/99; 428/304.4

(58) Field of Classification Search ........... 428/36.9, 428/60, 61, 99, 304.4; 138/119, 120, 149
See application file for complete search history.

(56) References Cited

U.S. PATENT DOCUMENTS

| 2,550,465 A | 4/1951 | Gorski | ............ 154/44 |
| 2,962,402 A | 11/1960 | Sweeney | ............ 154/44 |
| 3,425,456 A | 2/1969 | Schibig | ............ 138/162 |
| 3,557,840 A * | 1/1971 | Maybee | ............ 138/149 |

(Continued)

FOREIGN PATENT DOCUMENTS

AU   59354/80   1/1981

(Continued)

OTHER PUBLICATIONS

English Abstract of FR 2295336A.*

(Continued)

*Primary Examiner*—Terrel Morris
*Assistant Examiner*—Victor Chang
(74) *Attorney, Agent, or Firm*—Synnestvedt & Lechner LLP

(57) ABSTRACT

Disclosed is a pre-formed insulation module (310, 320) for insulating a process component having opposed longitudinally extending contacting surfaces (390) extending along a length thereof and terminal contacting surfaces (337, 387) at each end thereof comprising: a) at least one first inner insulation layer (314) being constituted of an insulation material having suitable thermal shock characteristic under cryogenic conditions and having one surface (314d) proximate or contacting with a component to be insulated; b) at least one second outer insulation layer disposed radially outwardly of said inner insulation layer (314); c) at least one water vapour barrier layer (319); d) a cladding layer (318).

17 Claims, 8 Drawing Sheets

U.S. PATENT DOCUMENTS

| | | | |
|---|---|---|---|
| 3,929,166 A | 12/1975 | Westerheid | 138/149 |
| 4,122,640 A | 10/1978 | Commins et al. | 52/248 |
| 4,287,245 A * | 9/1981 | Kikuchi | 428/36 |
| 4,436,119 A | 3/1984 | Shahan et al. | 138/149 |
| 4,921,018 A * | 5/1990 | Dridi et al. | 138/149 |
| 5,020,481 A | 6/1991 | Nelson | 122/494 |
| 5,565,652 A * | 10/1996 | Frye | 174/24 |
| 5,611,374 A | 3/1997 | Blin et al. | 138/149 |
| 5,722,462 A * | 3/1998 | Dridi et al. | 138/149 |
| 6,403,182 B1 * | 6/2002 | Plummer et al. | 428/36.9 |
| 6,530,137 B1 * | 3/2003 | Dewimille et al. | 29/527.2 |

FOREIGN PATENT DOCUMENTS

| | | |
|---|---|---|
| AU | 13469/95 | 8/1995 |
| DE | 203591 | 10/1983 |
| DE | 37 30 357 | 3/1989 |
| DE | 297 06 323 | 2/1997 |
| DE | 196 31 291 | 2/1998 |
| EP | 0 297 612 | 7/1998 |
| FR | 1159733 | 7/1958 |
| FR | 2613814 | 10/1988 |
| FR | 2704930 | 11/1994 |
| FR | 2 752 191 | 2/1998 |
| GB | 2096616 A * | 10/1982 |
| GB | 2 283 798 | 5/1995 |
| GB | 2 296 749 | 7/1996 |
| WO | WO 99/57481 | 11/1999 |
| WO | WO 00/05533 | 2/2000 |

OTHER PUBLICATIONS

Document Bibliography and Abstract of JP8014483, published Jan. 16, 1996 (Sanyo Electric Co. Ltd.) (Derwent Abstract Accession No. 96-114330/12).

Document Bibliography and Abstract of DE3906708, published Dec. 6, 1990 (Partek Corp.; Willich Daemmstoffe & Zubehoer).

Document Bibliography and Abstract of DE4225448, published Feb. 3, 1994 (Janich GmbH & Co.).

Abstract of SU706271, published Dec. 31, 1979 (Zhdanovtyazhmash) (Derwent Abstract Accession No. H2896C/34).

Abstract of SU1104339, published Jul. 23, 1984 (Andreev VA) (Derwent Accession No. 85054566/09).

Abstract of SE8804-482-A, published Jun. 13, 1990 (Abb Carbon AB) (Derwent Abstract Accession No. 99-236876/81).

Patent Abstracts of Japan, JP07-293786 (Dai Nippon) Nov. 1995 (1 page).

Patent Abstracts of Japan, JP09-014578 (Dia Chem KK) Jan. 1997 (1 page).

* cited by examiner

Sect A-A

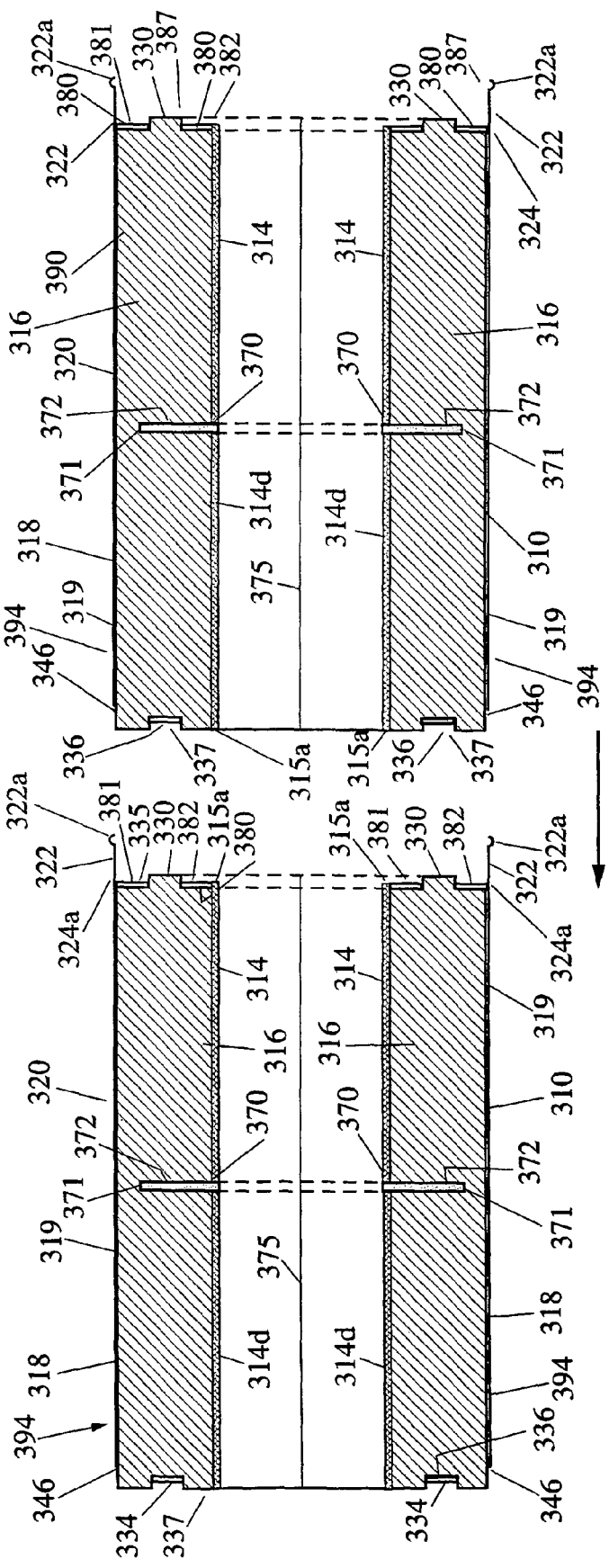

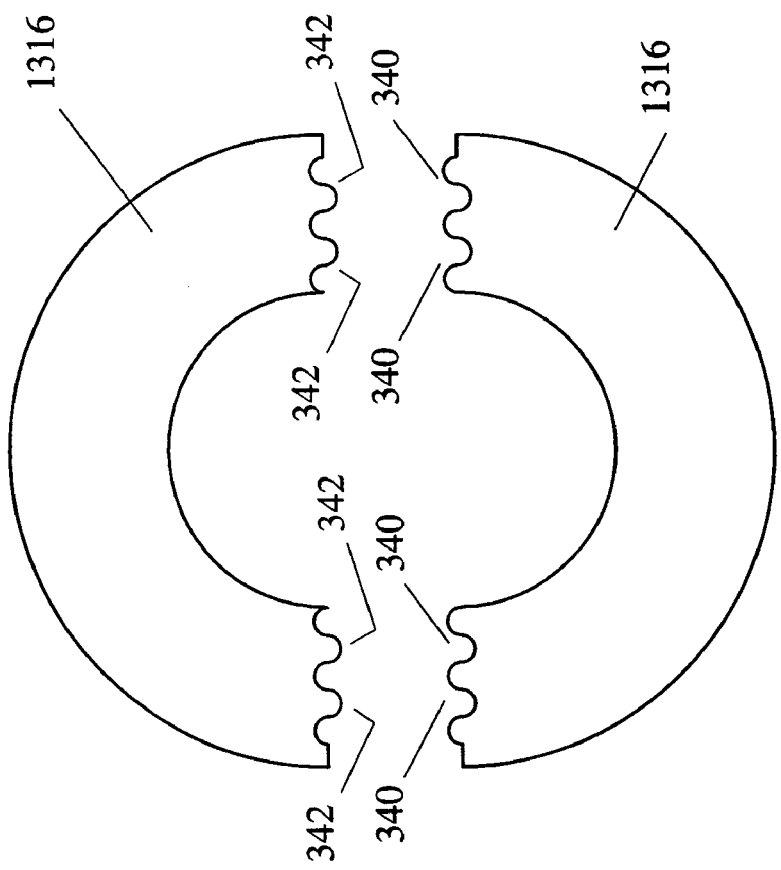

INSULATION MODULE, SYSTEM AND METHOD FOR INSTALLATION AND MANUFACTURE

FIELD OF THE INVENTION

This invention relates to an insulation module suitable for cryogenic applications; a system of modules for insulating a component; a method of manufacture of the insulation modules; and a method of installation of the insulation modules.

BACKGROUND TO THE INVENTION

The purpose of insulation is well known, it is to reduce the impact of ambient environmental conditions on desired temperature within the insulated environment by reducing the heat transfer driving force between the insulated and ambient environments. The insulation operation involves the location and fastening of layer(s) of insulating materials, which may be of the same or different nature, about the component to be insulated. The installation may involve wrapping of an insulating material about the component but other constructions, for example panel constructions, which are adhered or otherwise secured to the component may also be employed.

In the industrial context, the objectives of insulation of a component include maintaining a desired temperature within that component; and personnel protection. Thus in a chemical plant, tanks and pipes may hold or carry materials such as solids, gases or liquids which must be maintained within controlled temperature limits for efficient use within the process being conducted within the chemical plant.

Achievement of this objective is directly linked to the cost efficiency of the chemical plant as heating and cooling costs may be substantial and may be reduced by effective insulation to prevent heat loss or gain from the insulated component.

Insulation of a chemical plant is an expensive process. Generally, it has involved the installer in the transport of the necessary cladding and insulation materials to the site where it is then manufactured into the desired form to complete the insulation job. Therefore, the process is time consuming and requires a great deal of organisation to be competently and cost effectively carried out.

Development of suitable insulation materials for cryogenic processes poses a particular difficulty. Cryogenic plants in conventional use, for example in gas processing, operate at temperatures well below the freezing point of water. Indeed, temperatures may be −140° C. or lower. Therefore, insulation barriers in cryogenic plants are subject to high thermal shock or stress profiles making development of suitable insulators very difficult.

By way of example, the temperature difference between the interior of the insulated component and the ambient environment may be of the order of 200° C. such that expansion behaviour may be encountered in outer portions of the insulation and contraction behaviour may be encountered in inner portions of the insulation.

Still further, the insulation barrier must avoid ingress of water which, on freezing, will cause loss of insulation capability and possibly more serious problems including insulation failure. All these problems mean that specific insulation techniques and materials are required in cryogenic applications.

As with other insulation applications, major costs are encountered in the installation operation as various insulation materials must be fabricated on site to meet the requirements of the application.

SUMMARY OF THE INVENTION

It is the object of the present invention to provide insulation modules, systems and methods for the manufacture and installation of these which avoid, to the maximum practical extent, the cost, technical and safety disadvantages of current techniques while achieving the insulation objective.

With this object in view, there is provided a pre-formed insulation module for insulating a process component having opposed longitudinally extending contacting surfaces extending along a length thereof and terminal contacting surfaces at each end thereof comprising:

(a) at least one first inner insulation layer being constituted of an insulation material having suitable thermal shock characteristic under cryogenic conditions and having one surface proximate to a surface of a component to be insulated, (b) at least one second outer insulation layer disposed radially outwardly of said inner insulation layer;

(c) at least one water vapour barrier layer; and (d) a cladding layer, wherein said longitudinally extending contacting surfaces include a portion formed by a portion of at least one of said first inner insulation layer and said second outer insulation layer.

By pre-formed is meant that the insulation module may be manufactured, as a complete insulating article, prior to transfer to, and installation at, a factory site. The factory site may be very remote to the site where installation will take place. Such pre-fabrication of modules, which may be installed directly at the site, saves significant site costs and reduces the cost of the insulation project.

The pre-formed module may be made up of any desired number of insulating layer(s) and any desired number of cladding layer(s) though minimising the number of layers will facilitate accurate fabrication. Each layer is of nature and thickness appropriate to the application.

The insulating layers must firstly include, proximate the insulated component, and most advantageously in contact with it, at least one first inner insulation layer of an insulation material, ideally a polymeric foam which retains flexibility and does not embrittle at cryogenic temperatures. Such foam layer accommodates thermal expansion/contraction behaviour of the insulated component and must therefore have appropriate thermal shock characteristics at cryogenic temperatures. Exemplary of such an insulating material is a polyimide foam.

Further second layer(s) of insulating materials of same or different nature from the first layer(s) may be employed radially outwardly from the first insulation layer. Polyisocyanurate resin (PIR), polyurethane or possibly other polymer foams, which may be harder than the first layer, may be employed for such further layers. Five or more such insulation layers may be provided, three or more of which may be formed of a polymeric foam. More advantageously, one or more of the insulation layers may be formed integral to facilitate fabrication. For example, the layers radially outwardly disposed from the inner insulation layer may be integrated to reduce the number of layers of insulation. Typically, the PIR or polyurethane foam layer may be formed as a single layer.

One or more layers, which may be located between the first and second layers, or radially outwardly thereof form a water vapour barrier. One such layer is preferably disposed radially outwardly of the second outer insulation layer(s). At least one water vapour barrier layer may be disposed between the cladding and a polymeric foam insulation layer. Metallic foils may be used as suitable barriers. Alternatively, a polymeric vapour barrier, such as Mylar or appropriately rated mastic, or suitable cladding having low water vapour transmission rate ("WVTR") may be employed. The water vapour barrier may be reinforced with glass fibres or by other means.

Each of the plurality of insulation and water vapour barrier layers is bonded to adjacent insulation layers by suitable technique. Advantageously, adjacent insulation layers may be adhered to each other by a suitable adhesive, rated to expected temperature of service. Mastics of various kinds may be suitable. As mastics are available at various temperature ratings, the mastic employed should be suitably selected for temperature and WVTR at that temperature. Thus different mastics may be required, one mastic being used to adhere outer insulation layers and another mastic being employed for adhering inner insulation layers.

The adhesion operation is one that must be conducted carefully as uniform application of adhesive is necessary across the contacting surfaces of the outer insulation layers, if appropriate insulation behaviour and avoidance of water vapour ingress is to be achieved. Meeting this requirement may necessitate manual application of the adhesive. Insulation materials may be blended together. The construction of the pre-formed module will be dependent upon the nature of the insulation job and the cost acceptability of the module.

The insulation layers must be fabricated having regard to stress profile. Thermally induced stresses will exist in both the longitudinal and radial directions of the insulation module and effective insulation must accommodate this. To this end, internal contraction/expansion joints may be formed along the length of the module and, optionally and advantageously, terminal contraction/expansion joints are formed, at each of its ends in the terminal contacting surfaces.

The modules will usually include connection means which may be joints allowing circumferential and longitudinal connection of respective adjacent modules such that no breaks occur in the insulation layer. Such connection means are formed in the longitudinal and terminal contacting surfaces of the module. The joints, of any suitable profile, for example a wave shape, are cut or otherwise formed in any number, or each, of the layers of the module. The joints may be staggered relative to each other. The joints are adhered together during installation using mastic or other suitable adhesive. The joints are designed to complement joints of modules intended to be adjacent. Other connection means may be formed in the cladding layer. Other fasteners, such as metal bands, may also be employed in connection of adjacent modules. The water vapour barrier layers may be arranged to overlap the longitudinal and circumferential joints.

The cladding layer may be formed to circumferentially overlap the insulation layers at one first end of a module. The overlap or lap portion may be swaged to allow connection to an adjacent module. At the other end of the module, the insulation layer underlaps the cladding layer in a design complementary to that of the first end. Some modules may be formed with longitudinally extending lap portions and complementary modules are formed without such lap portions.

Adjoining insulation modules are designed to achieve easy connection to one another for insulation of process components such as pipes and tanks may involve connection of a number of modules.

In the case where the component to be insulated is a pipe or pipe fitting, such as an elbow or T-joint, a pre-formed module may cover a portion of the pipe or pipe fitting. That module is connected to another module or series of modules to complete the insulation of the pipe or pipe fitting. Conveniently, the modules in this instance, may be semi-cylindrical in geometry or part-circular in cross section though the module may be a fractional cylinder of any desired circumferential extent. It may be found that semi-cylindrical modules are suitable for insulation of pipes to about 20" diameter, above that diameter the modules may be made a lesser fraction of a cylinder in circumference. That is it may be found more convenient to use more than two modules to insulate a length of pipe. It will be understood that the module need not be limited in its application to the insulation of pipes, need not be linear and may not be circular or part circular in cross-section. Many components, such as tanks, may be insulated using suitable pre-formed modules which need not be at all cylindrical in geometry. The determining factors in selection of the design of the module are as follows: the geometry of the component to be insulated, insulation requirements and cost.

In a still further aspect of the present invention there is provided a method of manufacturing an insulation module comprising forming insulation layers of insulating material as described above; forming a cladding material; assembling the cladding and insulation layers together; and forming the assembly into insulation modules for insulating components.

In a still further aspect of the invention there is provided an insulation system for insulating a process component comprised of pre-formed modules of the invention described above, adjacent modules being connected together by connection means as above described to form the insulation system insulating the component.

In a still further aspect of the present invention there is provided a method of insulating a component comprising manufacturing pre-formed modules as above described; securing pre-formed modules to a component, or part of a component, and other modules insulating the components to enable insulation of that component or part of the component.

Pre-formed modules making up the insulation may be connected to one or more adjacent module(s) and/or to the component or part of the component as above described.

The insulation module may be secured into position by fitting onto the component to be insulated. The fitting should take account of any thermal expansion and contraction of the insulated component. Modules can be interference or otherwise fitted together. The connection means may be mechanical or chemical in nature but must be durable taking into account environmental and plant conditions. For example, a chemical connection means such as an adhesive would require to be temperature resistant, water resistant, and resistant to small leakage or small plant concentrations of process materials. The connection means should allow water-tight sealing. Suitable sealants and tapes may be used for this application. Bands may be tightened about the modules to facilitate fastening to a component to be insulated.

The module, system and method of installation forming aspects of the present invention present cost, efficiency and safety advantages over systems and methods currently employed for insulation. Insulation modules are also readily replaceable in the event of service failure.

BRIEF DESCRIPTION OF THE DRAWINGS

The various aspects of the invention may be more completely understood from the following description of preferred embodiments thereof made with reference to the accompanying drawings in which:

FIG. 5 is a side sectional view of two opposed preformed modules according to the invention;

FIG. 6 is a side sectional view of two further opposed modules longitudinally adjacent to the modules of FIG. 5 prior to assembly;

FIG. 8 is an end view of an outer insulation layer preform for fabrication into the module of FIGS. 1 to 7;

DETAILED DESCRIPTION OF PREFERRED EMBODIMENTS OF THE INVENTION

Modules

Figure 1:
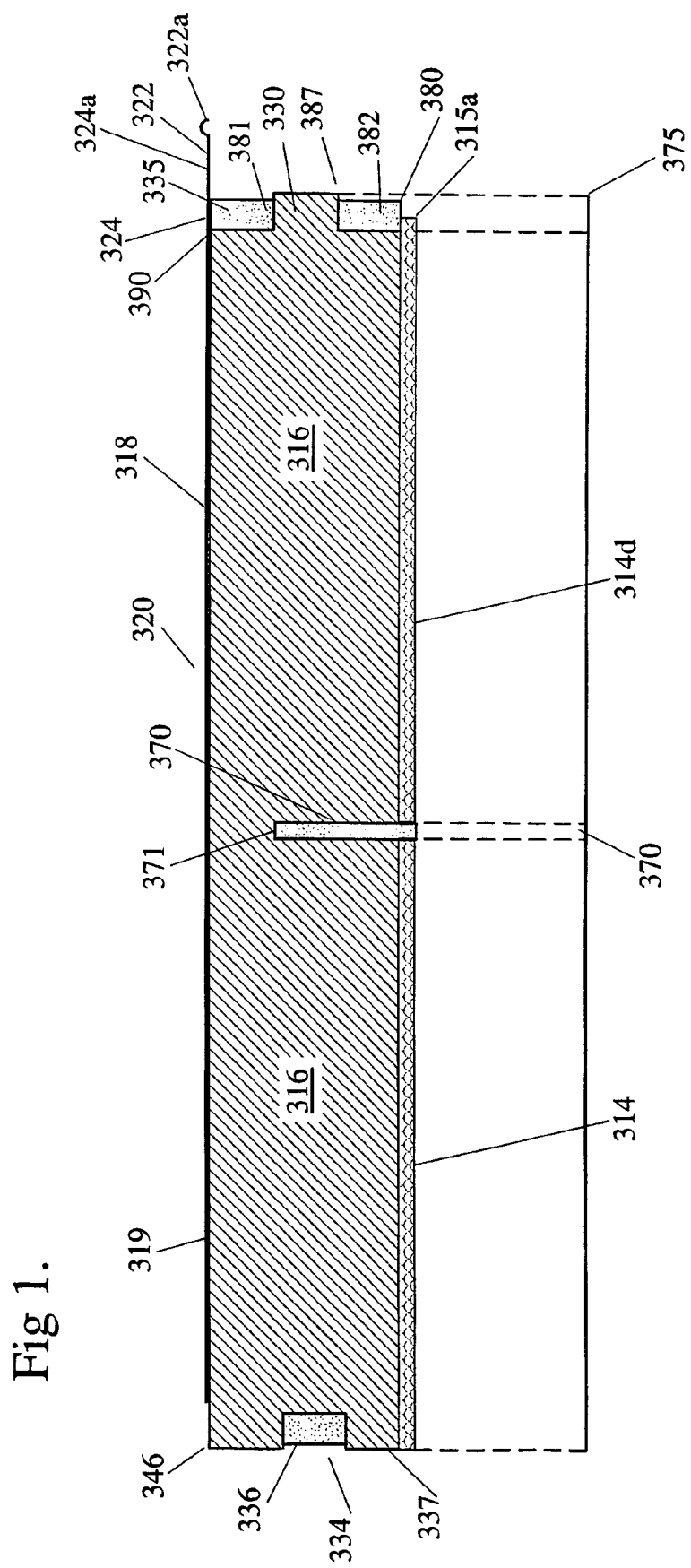
FIG. 1 is a side sectional view of a pre-formed module suitable for insulation of a length of pipe made in accordance with one embodiment of the present invention.

Referring now to FIGS. 1 to 7, there are shown insulation modules 310 and 320 suitable for use in cryogenic applications. Modules 310 and 320 are designed to be connected together to insulate a length of pipe and accordingly are part cylindrical and linear to achieve this task. The part-cylindrical linear geometry is not the only possible design for modules of the invention. The design of the module accommodates the special challenges inherent in cryogenic insulation. Chief of these challenges is the need to accommodate the high thermal stresses induced by a temperature differential of some 200° C. to 250° C. between the interior of insulated component and ambient environment.

Each module 310 and 320 has a first inner insulation layer 314 which forms a thermal shock absorption layer suitable for cryogenic applications and formed from a flexible polyimide foam. Inner insulation layer 314 has an inner surface 314d for contacting the pipe to be insulated as well as longitudinal contacting surfaces 315 and terminal contacting surfaces 315a. A suitable polyimide foam is available under the trade mark TA 301 SOLIMIDE supplied by Imi-Tech Corporation. This layer 314 will take up thermal expansion/contraction of the pipe. No gap is left to take up such expansion/contraction as left in conventional practice.

Second outer insulation layer 316 is disposed radially outwardly from layer 314 and is fabricated from a suitable polymeric foam such as polyurethane or polyisocyanurate (PIR) foam for insulation applications. This layer 316 is formed with longitudinally extending contacting surfaces 390 and terminal contacting surfaces 337, 387. Surfaces 390 are formed with flat surface portions 391.

Each layer is part-cylindrical, actually generally semi-cylindrical, in shape and each layer is co-axially disposed about a longitudinal axis of each module 310 and 320. The number and thickness of each of layers 314 and 316 is selected in accordance with appropriate engineering standards having regard to the particular insulation application.

A water vapour barrier layer 319 is also disposed radially outwardly from outer layer 316. The material of the layer 319 must have very low water vapour transmission rate (WVTR) and may be a metallic foil, such as aluminium foil, polymeric film or laminate such as that available under the trade mark MYLAR. Mastics available under the trade name Foster 60-38 or 60-39 may be used (WVTR 0.08 perm at 30 mils dry (0.05 metric perm) Glass cloth, such as Foster No. 10, or glass or other fibres may be used as reinforcement for the barrier material. A further water vapour barrier layer, say of mastic, may overlap this.

The outermost cladding layer 318 may take the form of a metallic or polymeric material such as aluminium or steel. A corrosion resistant material is preferred. Alternatively, the cladding layer 318 may be fabricated from a fireproofing material such as that available under the registered trade marks CHARTEK, available from Chartek Inc; or THERMALAG, available from Thermal Science Inc. Cladding layer 318 may form a water vapour barrier layer.

Layers 314, 316 and 319 may be adhered or bonded together in any appropriate way advantageously using a suitably selected adhesive which must be appropriately rated for the temperatures it will encounter in service. The adhesive may advantageously be a water vapour barrier. Accordingly, an adhesive layer may be disposed between insulation layers 314 and 316. Mastic may constitute the adhesive layer. The temperature rating of the mastic is −29° C. to +121° C. and a suitable product is available under the trade mark 60-38 Foster or 60-39 Foster. Failure to use an appropriately rated adhesive may result in cold embrittlement, ice formation, delamination or some failure of the insulation module.

Foam insulation layer, 316 incorporates at least one suitable internal contraction/expansion joint 370 formed along the length of modules 310 and 320. Joint 370 may take the form of a part-cylindrical recess, occupied by a suitable flexible material part-circular, actually semi-circular, preform part 372 such as polyimide foam as above described, designed and arranged to accommodate expansion/contraction of the insulation layer 316 of modules 310 and 320. Part 372 neatly fits the recess of joint 370. As most contraction behaviour is observed inwardly of about one third of the distance from the insulation module 310 surface to the component surface, the contraction/expansion joint 370 need not extend to the surface. It terminates at a suitably located terminal end 371. Contraction/expansion joints, 334, 335 and 380 may also be formed at each end of module 310 and 320 in the terminal contacting surfaces 337 and 387.

Modules 310 and 320 are fabricated with complementary longitudinal joints 340, 342 and complementary circumferential joints 330, 334 designed to respectively allow suitable secure connection of adjacent radially disposed modules 310 and 320 as well as longitudinally disposed modules 310, 320 (as shown in FIG. 6). A number of jointing techniques may be used.

Figure 9:
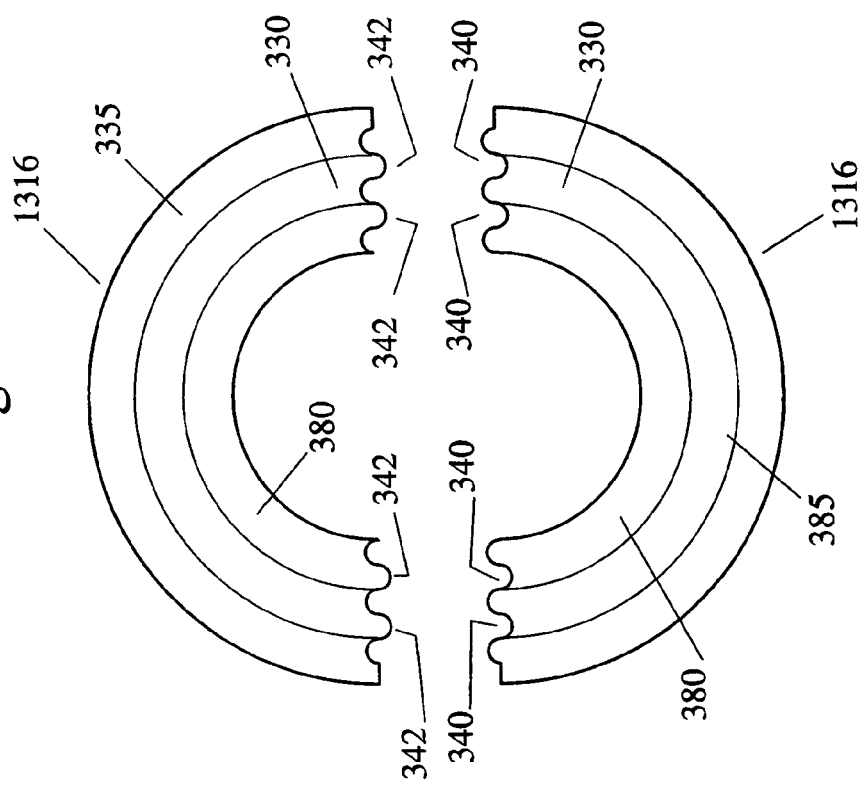
FIG. 9 is an end view of one end of the preform of FIG. 8 following cutting of an end contraction/expansion joint.

The complementary longitudinal profile joints having curved surfaces of peak 342/trough 340 kind, in which—on securement—peak 342 fits trough 340, are cut into the longitudinally extending contacting surfaces 390 of the modules, as conveniently shown for end 387 of modules 310 and 320 in FIG. 9. Other profiles could be used.

At each end of the insulation module 310 and 320, foam insulation layers 314 and 316 are fabricated with circumferential joints 330, 334 cut in the terminal contacting surfaces 337 and 387 as shown in FIGS. 1 to 7. At one first end, circular section grooves 335 and 380 are cut into terminal contacting surface 387 to form tongue portion 330. At the other end, circular section groove 334 is cut into terminal contacting surface 337 to form a complementary connection means to tongue portion 330 of an adjacent module (as seen in FIGS. 5 and 6). Other designs are possible. Each such circumferential joint is of appropriate design and sufficient area to allow a good secure bond to be made between complementary adjoining insulation layers of adjoining insulation modules with the appropriately temperature rated adhesive, advantageously a mastic.

Cladding layer 318 is formed to overlap insulation layer 316 at the first end, that end at which tongue portion 330 is formed. Insulation layer 316 underlaps cladding layer 318 at the other end where insulation layer 316 has an exposed portion 346. The overlap 322 is swaged to clip over one end of the cladding layer 318 of a longitudinally adjacent module 320 at installation (see FIG. 6). Both modules 310 and 320 have such a circumferential overlap portion 322. Module 320 additionally is formed with longitudinally extending overlap portion 322.

A flexible strip 324, for example of rubber such as butyl rubber or rubber of similar properties, is adhered on an inner surface of cladding section 318 at the first end 387 of module 320 overlapping the joint between insulation layer 316 and overlap 322. It accommodates movement and forms part of an end contraction/expansion joint. During installation, strip 324 is to be adhered to exposed portion 346 of insulation layer 316 of a longitudinally adjacent module (see module 320 of FIG. 6 which is longitudinally adjacent to module 320 of FIG. 5).

At the other end 337 of each module 310 and 320, insulation layer 316 extends beyond the cladding layer 318 creating exposed portion 346. On connection to a longitudinally adjacent module, the cladding layer 318 will be complete. In this regard, the overlap portions 322 which extend longitudinally along module 320, may clip over cladding layer 318 of a longitudinally opposed module 310 of which cladding layer 318 is substantially flush with longitudinally extending contacting surfaces 390. Beads (not shown) may be appropriately formed along module 310 over which swaged portion 322a of longitudinal overlap 322 engage to make more secure connection.

On assembly, circular foam part(s) 381 and 382 are located in grooves 335 and 380 to form the entire contraction/expansion joint at the first end. These flat parts 381 and 382 may be formed from polyimide foam or other suitable material to accommodate service stress. At the other end, a circular foam part 336 is located in groove 334 to form the other terminal contraction/expansion joint.

Figure 11:
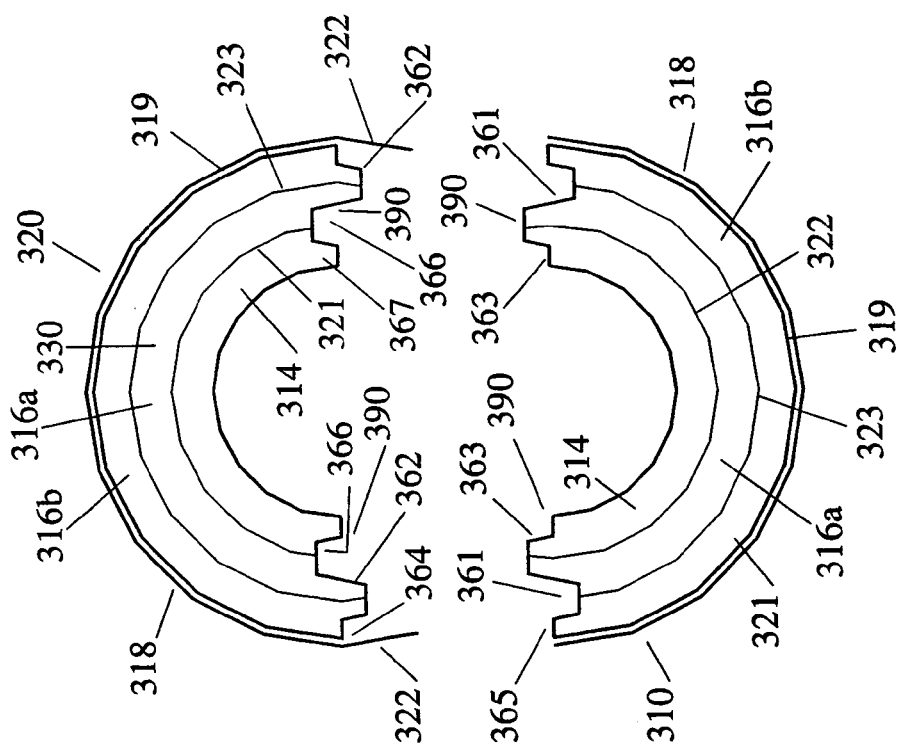
FIG. 11 is an end view of two modules of a second embodiment of the invention prior to assembly.

In another embodiment of this present invention, as shown for example in FIG. 11, the insulation layer 316 may be segmented into further insulation sub-layers. All such sub-layers may be adhered together as will be described further below. Each module 310 and 320 has a number of layers: inner foam insulation layer 314, outer foam insulation layers 316 and 316b and a cladding layer 318. Water vapour barriers 319, 321, 323 of suitable materials (as described herein) are also disposed between cladding layer 318 and foam insulation layer 316b; and between foam insulation layers 314, 316a and 316a, 316b respectively. All water vapour barrier layers 319, 321, 323 must have very low water vapour transmission rate (WVTR) and may be fabricated from a metallic foil such as aluminium foil or a polymeric film or laminate such as that available under the trade mark MYLAR or mastics as above described. Glass cloth, Foster No. 10 glass cloth, could be used as reinforcement for mastic. Insulation layer 314 is formed from polyimide foam.

Further insulation layers 316a and 316b are fabricated from a polymeric foam such as polyurethane or polyisocyanurate foam. Each layer is substantially cylindrical and co-axial. The thickness of each layer is approximately 50 mm, the exact thickness will be selected in accordance with appropriate engineering standards.

Each foam insulation layer 314, 316a, 316b incorporates at least one suitable contraction/expansion joint 370 designed and arranged to accommodate expansion/contraction along the portion of pipe insulated with the insulation modules 310 and 320. It will be noted that each contraction/expansion joint 370 is staggered in longitudinal and circumferential location relative to another. This arrangement is used to allow secure jointing and minimum risk of water vapour ingress.

Each insulation layer 314, 316a and 316b is bonded to adjoining insulation or water vapour barrier layer(s) by a suitable technique such as adhesion. In the embodiment shown, each layer is bonded to its adjacent layer by mastic adhesive.

Insulation and water vapour barrier layers 323, 316b and 319 are adhered together by mastic having temperature rating −29° C. to +121° C. and available under the trade mark 60-38 Foster or 60-39 Foster.

As layers disposed inward of secondary water vapour barrier 323, that is 314, 316a and 322 are subject to colder temperatures, a different mastic or adhesive having colder temperature rating is used. A suitable adhesive is available under the trade mark 60-96 Foster and has rating −190° C. to +120° C. Failure to use an appropriately rated adhesive may result in cold embrittlement delamination or some failure of the insulation module.

Each foam insulation layer 314, 316a and 316b is fabricated with both circumferential joints of tongue and groove kind as above described relative to FIGS. 1 to 7, tongue 330 being shown in the drawing. First longitudinal joints 362, 364, 366 and 367 are formed on longitudinally extending surfaces 390 of module 320. Complementary longitudinal joints 361, 363 and 365 are formed on longitudinally extending surfaces 390 of module 310. These longitudinal joints form a square stepwise arrangement in contrast with the embodiment described with reference to FIGS. 1 to 10. Joints 361 to 367, and the circumferential joints, are designed to allow suitable secure connection of adjoining modules 310 and 320 as well as other modules not shown. A number of jointing techniques may be used. Water vapour barrier layers 321, 323 and 319 are arranged to overlap each of these joints.

Each such joint is of appropriate design and sufficient area to allow a good secure bond to be made between complementary adjoining insulation layers of adjoining insulation modules with the appropriately temperature rated adhesive, advantageously a mastic.

In an alternative embodiment, insulation layers 314 and 316*a* may have disposed between them a thin metallic foil, such as a silver foil, which may assist in the accommodation of thermal stresses.

Figure 12:
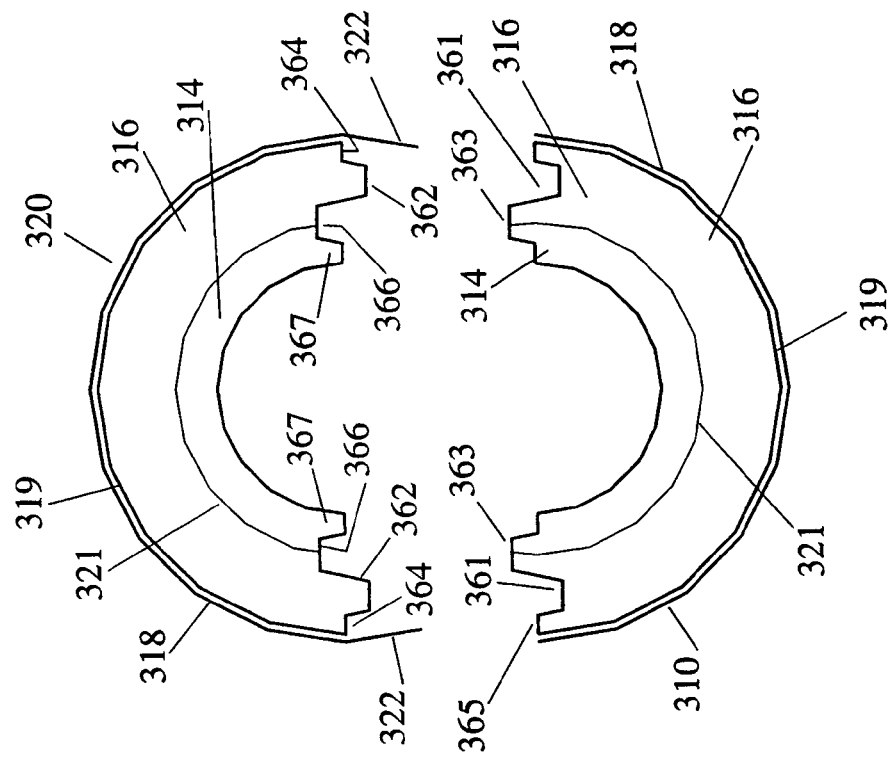
FIG. 12 is an end view of two modules of a third embodiment of the invention prior to assembly.

FIG. 12 shows a construction in which insulation layers 316*a* and 316*b* are formed integral as one layer 316 of greater thickness. The intervening adhesive/water vapour barrier layer 323 is omitted. The jointing technique is the same as shown for FIG. 11.

The modules described with reference to FIGS. 1 to 7, 11 and 12 are available from Bains Harding Industries Pty Ltd under the trade mark CRYO-LAG.

Method of Manufacture

The manufacture of the insulation modules 310 and 320 will be described hereinbelow with reference to the preferred modules as shown in FIGS. 1 to 7.

Figure 10:
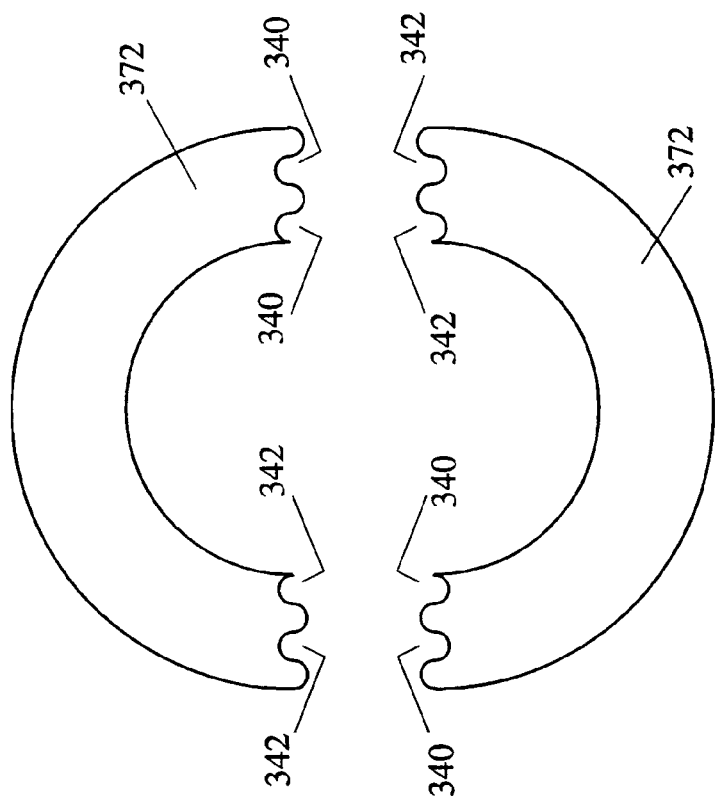
FIG. 10 is an end view of polyimide preforms for installation into an internal contraction/expansion joint of the module shown in FIGS. 1 to 7.

Firstly, are obtained polyimide preforms of semi-cylindrical shape to form the inner thermal shock layer 314. No joints need be formed in these. The polyimide is as above described. Also are fabricated PIR semi-cylindrical preforms 1316 of suitable length to form insulation layer 316. These preforms 1316 have joining profile with peak 342/ trough 340 profile as shown in FIG. 8. Polyimide sections 372, of flat geometry, as shown in FIG. 10, are formed to fit contraction/expansion joints 370. These have the longitudinal joint profile of pre-forms 1316. Other materials could be used.

Polyimide flat circular half sections 336, 381 and 382, having complementary shape and size to grooves 334, 335 and 380, to be formed as described below, are also prepared for the terminal contraction/expansion joints.

Figure 3:
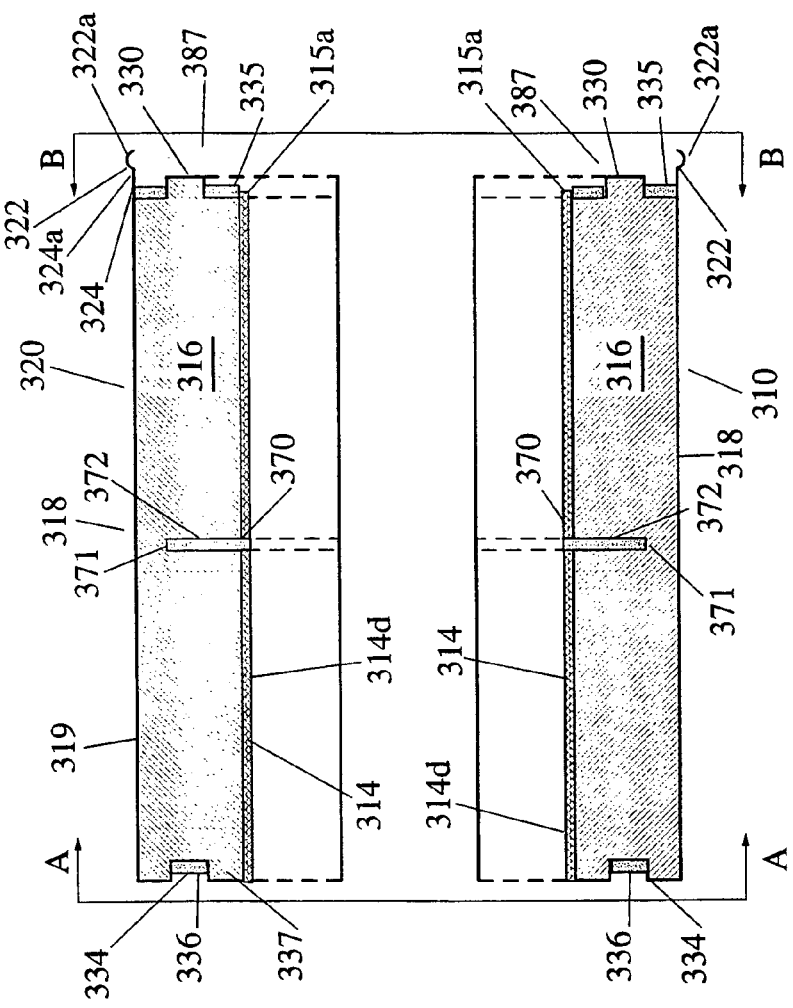
FIG. 3 is a side sectional view of the two opposed preformed modules shown in FIG. 2.
Figure 2:
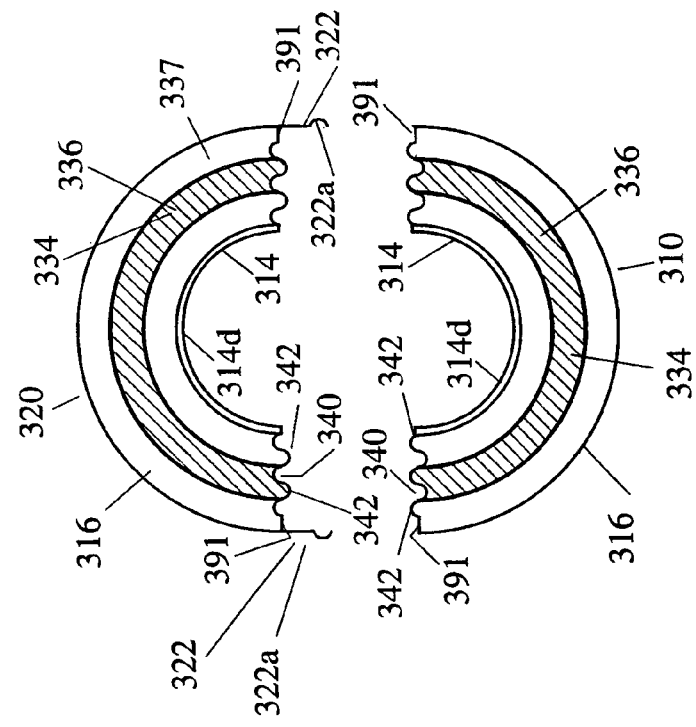
FIG. 2 is an end view along line A—A of FIG. 3 of one end of two opposed pre-formed modules for insulating a pipe section in accordance with a first embodiment of the present invention.
Figure 4:
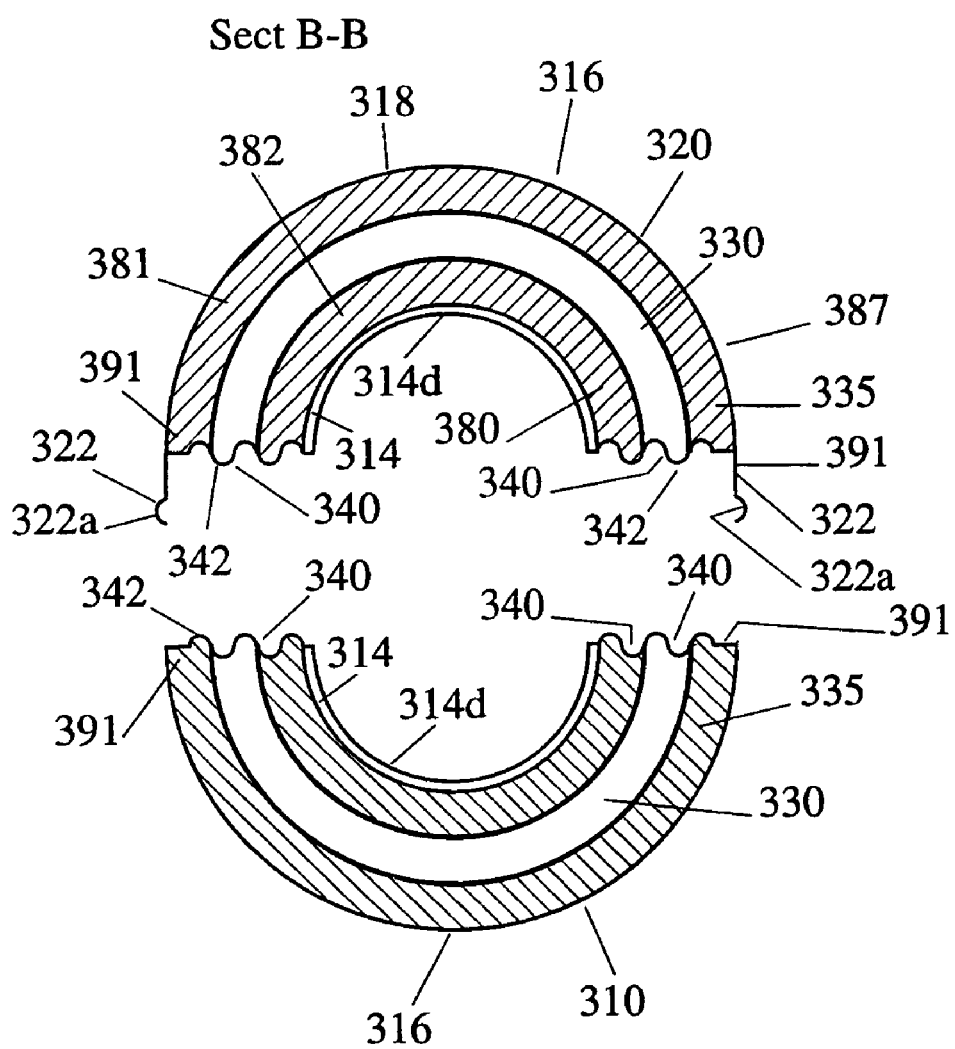
FIG. 4 is an end view along line B—B of FIG. 3 of one end of the two opposed pre-formed modules of FIGS. 2 and 3.
Figure 7:
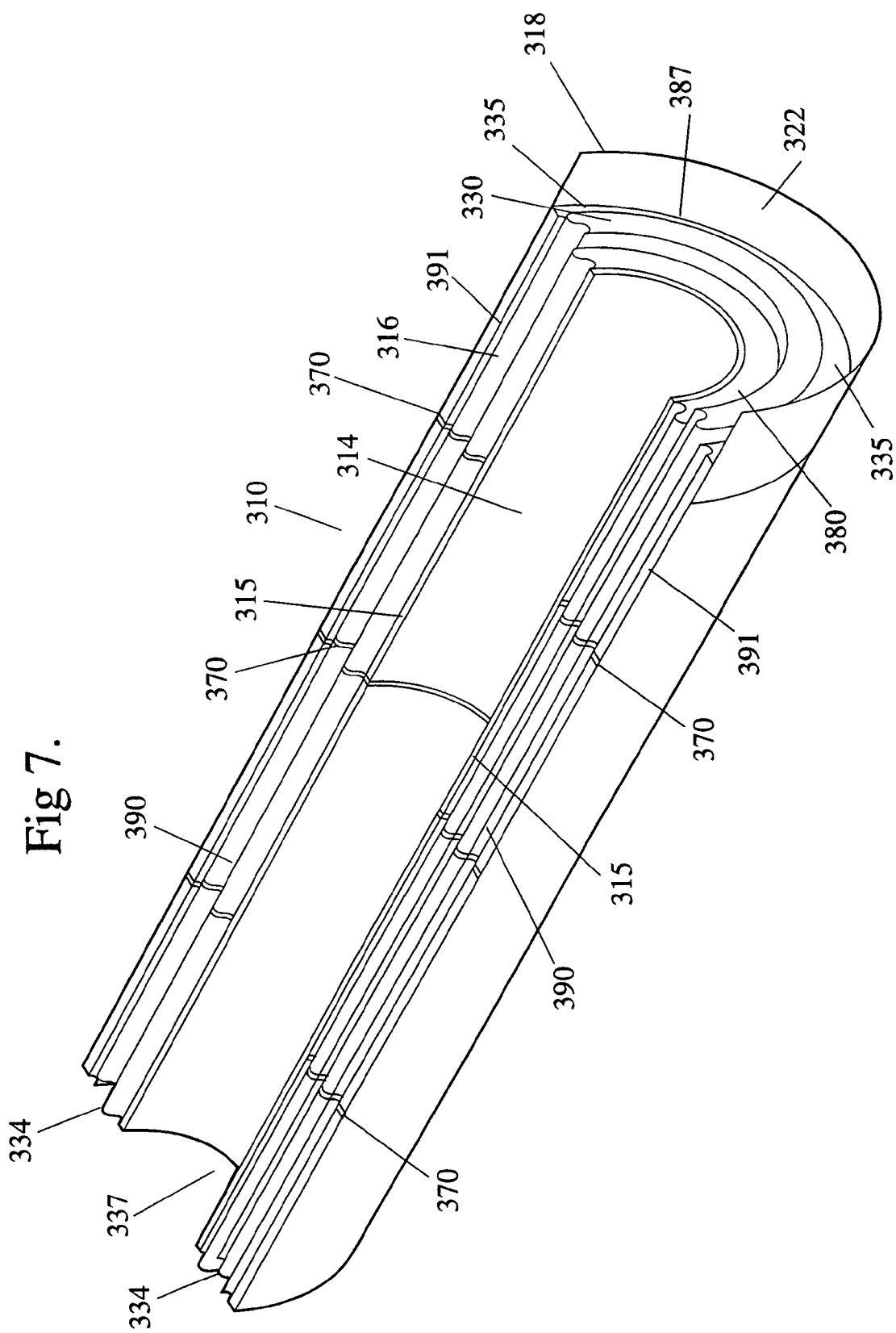
FIG. 7 is a top perspective view showing the module of FIGS. 1 to 4 and its circumferential and longitudinally extending joints.

Grooves 380 and 335 are cut into one end 387 of preforms 1316 as shown in FIG. 8 to form tongue 330. An internal circumferential groove 334, complementary to tongue 330, of suitable width and depth may then be cut into the other end 337 of each of the PIR semi-cylindrical pre-forms 1316 shown in FIG. 8. The end circumferential grooves 335 and 380, as shown in FIG. 3 occupied by polyimide half sections 381 and 382, are also cut into the PIR pre-forms 1316. The PIR pre-forms 1316 may then be assembled and temporarily taped together.

Then are prepared sheet metal cladding sections to form cladding layer 318 of each module 310 and 320. One such section may be formed with no longitudinal lap and another may be formed with a longitudinally extending lap longitudinal portion 322. Both sections are formed with circumferential laps. The no lap piece is swaged at one of its ends and the lap piece is swaged along three sides leaving one end unswaged. A circumferential installation line 394 marking the end of overlap of adjacent modules 310 and 320 is marked at preset distance from the unswaged end. A bead may be formed at this line for engaging with circumferential lap portion 322*a*. The section is then rolled to appropriate diameter.

Strips 324 of flexible material, for example, of rubber such as butyl rubber, or other suitable materials 324 are then cut and bonded to the inside of the sheet metal section as shown in FIGS. 1, 5 and 6 with a suitable adhesive. Correct location of butyl rubber strips 324 and proper bonding to the sheetmetal is essential to accommodate movement and for proper function of the contraction/expansion joints.

Then an initial coat of adhesive, such as suitably rated mastic (water vapour barrier) as described above, may be applied to the surface of the PIR preforms 1316. Into the initial coat while still wet may be embedded a layer of Foster's glass cloth Number 10 to form the, reinforced, water vapour barrier layer. A second coat of mastic of greater thickness is then applied over the cloth. The longitudinal joints 340, 342 are not to be covered with the mastic.

While the mastic is still wet the PIR pre-forms 1316 are covered with sheet metal forming cladding layer 318 leaving a certain length of approximately 50 mm exposed as shown in FIG. 1. The longitudinal overlaps 322 on the lap section should be of the same length. The assembly may then be cured for 24 hours. Fabrication is then substantially complete.

At that point, polyimide internal contraction/expansion sections 336, 381, 382 may be inserted and bonded with mastic as described above into the internal grooves 334, 335 and 380. Polyimide pre-forms 314*a* are bonded into the corresponding PIR pre-forms 1316 to form the inner thermal shock layer 314.

The insulation module may be formed in lengths or customised to any particular component to be insulated, particularly for particular components such as pipe fittings in a process plant though other applications for the module may be envisaged. A kit of modules could be formed by cutting the lengths to smaller convenient sizes on-site or in the factory. These sub-modules are then available for installation at the plant. It may be understood that lengths and number of modules should be convenient for cost-effective transport to site.

In the case of a bend or elbow, suitably shaped pre-form elements of insulation and cladding materials to accommodate the elbow are obtained and assembled in the same manner of manufacture as modules 10 and 320 with cutting of the modules to the requisite shape.

Method of Insulation

The installation method for a pipe or pipe fitting using the modules as described with reference to FIGS. 1 to 10 proceeds as follows. It is to be observed that other suitable techniques for insulation are possible and the following description is not intended to be limiting.

Firstly, a bottom half "no longitudinal lap" module 310 may be fitted under the pipe. A first adhesive, for example, mastic, available under the trade mark Foster 60-38 or 60-39 is then applied to surface portions 391 only of longitudinally extending contacting surfaces 390 of modules 310 and 320 over the Foster No. 10 glass cloth reinforced water vapour barrier layer 319. A joint sealant, mastic of same or different temperature rating to the first mastic, such as that available under the trade mark Foster 95-50 may then be applied along the curved surfaces 340, 342 forming the longitudinal joints in surfaces 390. The longitudinally extending contacting surface 315 of polyimide layer 314 of module 310 is not to be covered with sealant. This will have a dry contact with the opposed surface 315 of upper adjacent module 320. Parts 372 are inserted into internal contraction/expansion joints 370 of each module to achieve a neat fit. Bonding may be used. Then the top lap module 320 may be loosely adhesively secured along the complementary longitudinally extending contacting surfaces 390 and 391 to avoid breaks in insulation so that module 310 can not slide along the pipe. Longitudinal overlap portions 322 of module 320 may be clipped into place over cladding layer 318 of module 310. Joints may be taped.

Mastic is then applied to exposed portions of polyimide parts 381 and 382, tongues 330 and exposed portions 324*a* of butyl rubber strip 324 of installed modules 310 and 320 (see FIG. 5). The previous steps are repeated for the next pair of longitudinally adjacent modules (see FIG. 6) such that longitudinal seams 375 are staggered relative to seams 375 of the first portion 324*a* of pair of modules. Module pair 310/320 (FIG. 6), having terminal contacting surface 337 and exposed portions 346 appropriately coated with mastic, excepting the circumferential contacting surface 315a of layer 314, is slid, in the direction of the arrows, towards module pair 310/320 (FIG. 5) until the circumferential installation line 394 is reached or a bead engages with circumferential overlap portion 322. This will have the effect of compressing parts 336 of module 320 (FIG. 6) and parts 381, 382 of first module 320 (FIG. 5) with adhesion of adjacent modules at the complementary joints tongue 330 and groove 334 and at the complementary terminal contacting surfaces 337 and 387 of the adjacent module pair to avoid breaks in insulation.

Stainless steel bands may then be tightened on module pair constituted by modules 310 and 320 (FIG. 5) such that an insulation barrier is properly formed about the pipe to promote adhesion of the contacting surfaces of adjacent insulation modules. It is to be remembered that dry contact is to be maintained at contacting surfaces 315, 315a of the inner thermal shock layer 314 of all adjacent modules as well as at contacting surfaces of parts 372 of the bottom and upper modules.

The above steps are then repeated for the bottom half of the next section of pipe. Fitting is commenced adjacent the previously described assembly. In each case, the next module pair is appropriately prepared, as above, and slid towards the previously fitted module until the circumferential installation line 394 has been reached compressing the polyimide half-sections 381, 382 some distance. Longitudinal seams 375 are staggered. After such fitting, stainless steel bands may be tightened on the previous module pair.

The above steps are repeated until the installation operation is complete. Much the same process, allowing for differences in geometry, is conducted for components other than pipes.

Modifications and variations may be made to the present invention or consideration of the disclosure by the skilled reader of this disclosure. Such modifications and variations are considered to fall within the scope of the present invention.

The claims defining the invention are as follows:

1. A pre-formed insulation module for insulating a process component having opposed longitudinally extending contacting surfaces extending along a length thereof and terminal contacting surfaces at each end thereof comprising:
  (a) at least one first inner insulation layer being constituted of a flexible insulation material having a capacity to withstand thermal shock under cryogenic conditions and having one surface proximate to a surface of a component to be insulated;
  (b) at least one second outer insulation layer disposed radially outwardly of said inner insulation layer;
  (c) at least one water vapour barrier layer;
  (d) a cladding layer distinct from said at least one water vapour barrier layer; and
  (e) at least one contraction/expansion joint positioned between the ends of the module, said contraction/expansion joint comprising a recess extending circumferentially around a longitudinal axis of said module and radially outwardly from said one surface, said recess terminating in spaced apart relation to said cladding layer and providing for longitudinal expansion and contraction of said insulation layers.

2. The module of claim 1 including connection means for connecting said module to an adjacent module for insulating said component.

3. The module of claim 2 wherein said connection means are circumferentially and longitudinally disposed relative to a longitudinal axis of said module.

4. The module of claim 3 wherein said circumferentially disposed connection means are formed in the terminal contacting surfaces and the longitudinally disposed connection means are formed in said longitudinally extending contacting surfaces.

5. The module of claim 3 wherein said connection means are tongue and groove joints, complementary joints being formed at each end of the module.

6. The module of claim 4 wherein said connection means are tongue and groove joints, complementary joints being formed at each end of the module.

7. The module of claim 1 wherein said inner insulation layer is formed from a first insulation material and said outer insulation layer is formed from a second insulation material said first insulation material having substantially different thermal shock characteristics from those of said second insulation material.

8. The module of claim 7 wherein said at least one insulation layer is formed of polyimide foam, then at least one outer layer is formed of polyisocyanurate resin and the water vapour barrier layer, radially outwardly disposed from said second outer insulation layer, is formed from a material selected from the group consisting of metallic foils, polymeric films, mastics, and fibre-reinforced such materials.

9. The module of claim 1 wherein said contraction/expansion joint is a recess having a terminal end formed in said at least one second outer insulation layer.

10. The module of claim 1 wherein a contraction/expansion joint is formed in terminal contacting surfaces of the module at each end thereof.

11. The module of claim 2 wherein said inner insulation layer is formed from a first insulation material and said outer insulation layer is formed from a second insulation material said first insulation material having insubstantially different thermal shock characteristics from those of said second insulation material.

12. The module of claim 3 wherein said inner insulation layer is formed from a first insulation material and said outer insulation layer is formed from a second insulation material said first insulation material having substantially different thermal shock characteristics from those of said second insulation material.

13. The module of claim 4 wherein said inner insulation layer is formed from a first insulation material and said outer insulation layer is formed from a second insulation material said first insulation material having substantially different thermal shock characteristics from those of said second insulation material.

14. A pre-formed insulation module for insulating a process component, said module comprising longitudinally extending module portions having opposed longitudinally extending contacting surfaces extending along a length thereof and terminal contacting surfaces at each end thereof, said module portions comprising:
  (a) at least one first inner insulation layer being constituted of a flexible insulation material having a capacity to withstand thermal shock under cryogenic conditions and having one surface proximate to a surface of a component to be insulated;
  (b) at least one second outer insulation layer disposed radially outwardly of said inner insulation layer;
  (c) at least one water vapour barrier layer;
  (d) a cladding layer distinct from said at least one water vapour barrier layer; and
  (e) a plurality of contraction/expansion joints positioned between the ends of the module, said contraction/expansion joints comprising recesses located in each of said module portions, said recesses in one said module portion being spaced apart longitudinally relative to said recesses in another said module portion, said recesses extending circumferentially around a longitudinal axis of said module and radially outwardly from said one surface, said recess terminating in spaced apart relation to said cladding layer and providing for longitudinal expansion and contraction of said insulation layers.

15. A preformed insulation module according to claim 1, wherein said recess extends radially outwardly ⅔ of the distance between said one surface and said cladding layer.

16. A preformed insulation module according to claim 14, wherein said recesses extend radially outwardly ⅔ of the distance between said one surface and said cladding surface.

17. The module of claim 1, wherein said recess is occupied by a flexible material.

* * * * *